Sept. 2, 1924.

A. R. SWANSON

SEWER VALVE

Filed Nov. 16, 1921

Witnesses:

Inventor:
Axel R. Swanson
By Wilkinson Huxley Byron & Knight
attys

Patented Sept. 2, 1924.

1,507,445

UNITED STATES PATENT OFFICE.

AXEL R. SWANSON, OF CHICAGO, ILLINOIS.

SEWER VALVE.

Application filed November 16, 1921. Serial No. 515,648.

*To all whom it may concern:*

Be it known that I, AXEL R. SWANSON, a citizen of the United States, residing at Chicago, in the county of Cook and State of Illinois, have invented certain new and useful Improvements in Sewer Valves, of which the following is a specification.

My invention relates to floor drain valves and has particular reference to that class of drain valves which have closure members so that in case the water backs up in the sewer or in the drain the closure member can be secured tightly in position forming a water tight joint and preventing the leakage of sewage or other back water into basements or the like.

Another and further object of my invention is the provision of a valve which is leak-proof and which when open allows the water to run freely therethrough and which when the water begins to back up, caused many times by heavy rains or through the rise of waters from flooded districts, etc., the drain can be closed by hand, thereby insuring a tight fitting non-leaking valve through which the sewage and back water cannot run.

Another advantage of my invention is the provision of a valve which can be closed by hand without the use of a wrench or other means of closing and secure a tight fitting closure which will prevent the water from draining therethrough.

These and other objects of my invention will be more readily and better understood by reference to the accompanying sheet of drawings, wherein—

Figure 1:
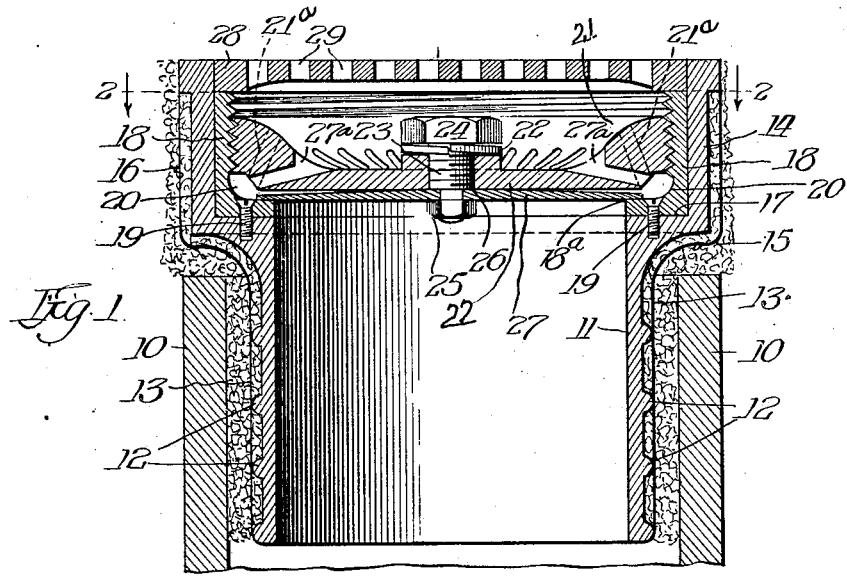
Figure 1 is a vertical sectional view of my improved invention.
Figure 2:
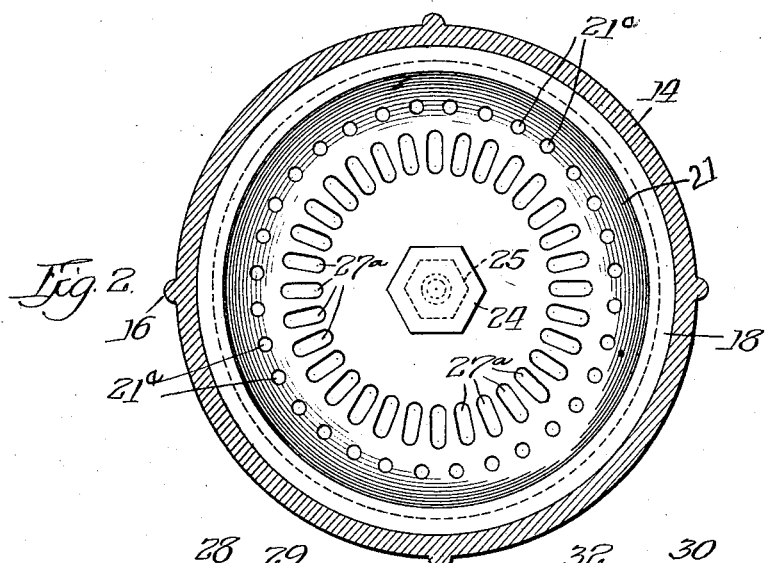
Figure 2 is a longitudinal view, partially in section and partially in elevation, on lines 2—2 of Fig. 1.

Referring now specifically to the drawings and in which like reference characters refer to like parts throughout, a drain pipe 10 is shown within which a valve body or valve member 11 is positioned, the said member 11 having peripherally extending ribs 12 on its lower portion and vertically extending ribs 13 thereon, and also has vertically extending ribs 14 on its upper portion and which is imbedded in the concrete 15 which forms the floor of a basement and which also provides a filling between the member 11 and drain pipe 10, so that the member 11 is held securely in position, the ribs 13, 14, and 15 serving to hold the member 11 tightly imbedded in the concrete floor 15. The upper portion of the member 11 is enlarged and has a peripherally extending shoulder 17 formed therein with an internally threaded valve guide 18 therein and which is held in engagement with the member 17 by means of screws 19—19 which are inserted in holes tapped into the member 11, the inner peripheral edge of which forms a valve seat 18[a]. An externally threaded valve 21 is provided which is in engagement with the valve guide 18 and which has a projection 22 on its lower portion, the said projection 22 being of less diameter than the member 18 so that a perripherally extending channel 20 is formed into which the water drains.

The valve 21 is dish or saucer shaped in its upper portion and centrally positioned thereof has a valve stem 23 extending therethrough, the stem 23 having a head 24 thereon and being in threaded engagement with a spring washer 22 on top of the valve 21. The stem 23 has a nut 25 on its lower end and a shoulder 26 against which a closure member 27 abuts, the said closure member being a disc of material whose edges overlap the inner edges of the valve seat 18[a]. The stem 23 is in threaded engagement with the valve 21 so that it turns for a slight distance through the member 21, when the valve is opened or closed.

Perforations 27[a]—27[a] extend through the valve 21 and terminate in the channel 20 an outer row of holes 21[a] also being provided which also terminate in the channel 20. A grating member 28 is inserted in the upper end of the member 11 and rests upon the upper edge of the valve guide 18, perforations 29 being provided in this grating through which the water passes.

Figure 3:
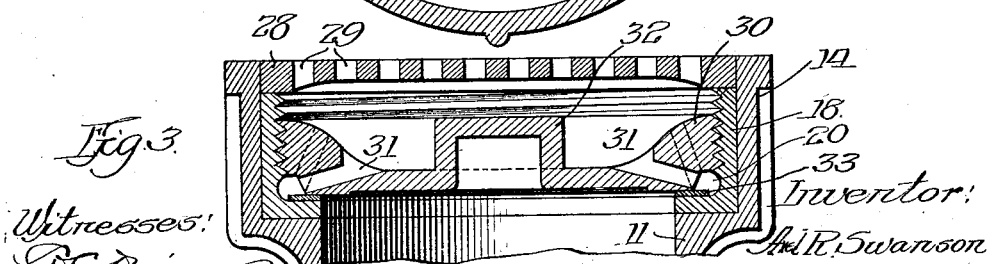
Figure 3 is a vertical sectional view of a modified form of my invention.

Figure 3 illustrates a slightly modified form of device in which the drain member 11 has the enlarged upper portion 14 and the internally threaded guide head 18 positioned in the same manner as illustrated in Figure 1. An externally threaded valve 30 is provided having perforations 31 therethrough which terminates into the channel 20, the valve 30 having a hexagonal central portion 32, by means of which the valve 30 is turned either by means of a wrench or by hand, as may be desired. A gasket 33 is provided, upon which the outer edge of the valve 30 seats, so that a tight joint is formed between the seat 18ª and the valve 30. The grating 28 is also provided having perforations 20 therethrough in exactly the same manner as heretofore described..

In closing the device, the operator grasps the head 24 of the stem 23 either by means of a wrench or with his fingers and turns the stem 23 to the right thus in effect screwing the stem 23 into the valve 21. As soon as the friction created between the head 24 and the washer 22 ovecomes the friction of the threads between the member 21 and seat 18ª, the valve 21 is turned downward until the member 27 is in engagement with the seat 18ª. As soon as the member 27 is in engagement with the seat 18ª, further turning of the stem 23 causes a slight separation of the members 27 and 21 but having a tight joint so that water will not pass through between the member 21 and the seat 18ª. It will be noted that the member 27 and the closure member 21 are in contact with each other only for a short distance of their surfaces so only a small amount of force is needed to turn the valve into closed positions, or opened, as may be desired. When it is desired to open the valve the stem 23 is turned to the left bringing the member 27 up against the member 21 until the friction produced between these members is sufficient to overcome the friction between the threads in the member 21 and guide member 18 when the member 27 will be raised from the seat 18ª so water can pass into the sewer.

When it is desired because of heavy rains or floods to close the device the stem 23 is turned downward and the member 21 turned down into place and the stem thereupon turns to the right which has the effect of driving downward upon the member 27 until these members are seated together and the valve 27 seated upon the edge 18 of the seat 18ª, which forms a water tight closure between the members 26, 27 and the seat 18ª.

In the modified form of the device, shown in Figure 3 a loosening of the valve 30 brings the lower edge of the valve up off the member 33 so that the water drains through the openings 31 into the channel 20 and down into the drain pipe. A closing and opening is effected by turning the member 32 down into engagement with the gasket 33 which is composed of lead or other soft material and forms an effective water tight joint between these two members.

While I have described more or less precisely the details of construction, I do not wish to be understood as limiting myself thereto, as I contemplate changes in form and the proportion of parts and the substitution of equivalents as circumstances may suggest or render expedient without departing from the spirit and scope of my invention.

I claim:

1. A cylindrical drain member, a valve guide in the upper portion of said drain member and a valve in engagement with said valve guide, an upper portion of said valve being of larger diameter than a lower portion thereof whereby a peripheral extending groove is formed around the valve at its lower side, the said valve having perforations therethrough connecting with said peripheral groove whereby when the said valve is open, water will drain therethrough and when closed prevents the flow of water therethrough.

2. A cylindrical drain member, an internally threaded guide member in the upper portion thereof, a valve in threaded engagement with said guide member and a loosely mounted circular member mounted upon the lower side of said valve member, the said valve member being of larger diameter at its upper side than at its lower side and having perforations therethrough which end in a peripheral groove formed adjacent the said guide member.

3. A drain valve comprising an open ended drain member having an enlarged upper end and having a circumferential shoulder therein, a valve guide mounted in the upper part of said drain member, a valve in threaded engagement with said valve guide, a lower portion of said valve being of less diameter than the upper portion thereof, the said lower portion being of larger diameter than the lower portion of said drain member, the said valve having holes therethrough which terminate around the outer edge of the said lower portion.

4. A drain valve comprising an open ended drain member having an enlarged upper end and having a circumferential shoulder thereon, a guide member in the upper part of said drain member forming a valve guide and seat, a valve in threaded engagement with said valve guide, a centrally located stem in threaded engagement with the said valve, and a closure bushing loosely secured to said stem and adapted to contact with the said shoulder when the valve is screwed down.

5. A drain valve comprising an open ended drain member enlarged at its upper end and having a circumferentially extending shoulder therein, a valve guide mounted on the upper part of said drain member, a valve having a dished upper surface in threaded engagement with said valve guide and having a projection on a lower part thereof whereby a channel is formed around the lower end of said valve, the said valve having diagonally extending openings therethrough ending above the lower outer edge of the said projection whereby water will drain through said member when the valve is in raised position and the drain will be closed when said valve is turned down.

Signed at Chicago, Illinois, this 27th day of October, 1921.

AXEL R. SWANSON.